(12) United States Patent
Shigematsu et al.

(10) Patent No.: US 12,242,635 B2
(45) Date of Patent: Mar. 4, 2025

(54) DATABASE SYSTEM, DISTRIBUTED PROCESSING APPARATUS, DATABASE APPARATUS, DISTRIBUTED PROCESSING METHOD AND DISTRIBUTED PROCESSING PROGRAM

(71) Applicant: Nippon Telegraph and Telephone Corporation, Tokyo (JP)

(72) Inventors: Mitsuhiro Shigematsu, Musashino (JP); Naoto Yamamoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 330 days.

(21) Appl. No.: 17/772,225

(22) PCT Filed: Oct. 28, 2019

(86) PCT No.: PCT/JP2019/042120
§ 371 (c)(1),
(2) Date: Apr. 27, 2022

(87) PCT Pub. No.: WO2021/084572
PCT Pub. Date: May 6, 2021

(65) Prior Publication Data
US 2022/0374541 A1    Nov. 24, 2022

(51) Int. Cl.
*G06F 21/62* (2013.01)
*G06F 16/2453* (2019.01)
*G06F 16/27* (2019.01)

(52) U.S. Cl.
CPC .... *G06F 21/6227* (2013.01); *G06F 16/24542* (2019.01); *G06F 16/27* (2019.01)

(58) Field of Classification Search
None
See application file for complete search history.

(56) References Cited

U.S. PATENT DOCUMENTS 9,378,244 B2 * 6/2016 Kim .................. G06F 16/24542
2003/0023667 A1 * 1/2003 Cho ........................ H04L 63/10
709/202

FOREIGN PATENT DOCUMENTS

| JP | 2019139538 | 8/2019 | |
| WO | WO 2017138062 | 8/2017 | |
| WO | WO-2017138062 A1 * | 8/2017 | ............. G06F 12/00 |

OTHER PUBLICATIONS

[No Author Listed] [online], "F.33 postgres_fdw," PostgreSQL: Documentation, available on or before Feb. 22, 2019, retrieved on Oct. 7, 2019, retrieved from URL <https://www.postgresql.org/docs/11/postgres-fdw.html>, 6 pages.

(Continued)

*Primary Examiner* — Daniel B Potratz
*Assistant Examiner* — Mayasa A. Shaawat
(74) *Attorney, Agent, or Firm* — Fish & Richardson P.C.

(57) ABSTRACT

A database system includes: a distributed processing apparatus 1; and a plurality of database apparatuses 2, in which the distributed processing apparatus 1 includes: a generation unit 12 that generates an execution plan for a query related to the database apparatuses 2 based on a security policy; a transmission unit 13 that divides the query in accordance with the execution plan and transmits instructions to the corresponding database apparatuses 2, the instructions including divided queries obtained by dividing the query and transfer destinations of execution results of the divided queries; and an output unit 14 that receives the execution result of the query, from the database apparatus 2, and outputs the execution result, the database apparatuses 2 each include an execution unit 22 that executes the divided query included in the instruction received from the distributed processing apparatus 1, and transmits the execution result to another database apparatus or the distributed processing apparatus serving as the transfer destination included in the (Continued)

instruction, and at least one of the output unit 14 and the execution unit 22 encrypts the execution result in accordance with the security policy.

5 Claims, 7 Drawing Sheets

(56) References Cited

OTHER PUBLICATIONS

[No Author Listed] [online], "Tableau," tableau.com, available on or before Jan. 20, 2015, retrieved on Oct. 7, 2019, retrieved from URL <https://www.tableau.com/ja-jp>, 4 pages (No Translation).

\* cited by examiner

Fig. 2

NO TRANSFER

| MEMBER ID | NAME | AGE | GENDER |
|---|---|---|---|
|  |  |  |  |
|  |  |  |  |
|  |  |  |  |

DEPARTMENT STORE MEMBER DATA

Fig. 3

| MEMBER ID | PURCHASE DATE AND TIME | PURCHASED PRODUCT NAME CODE | PURCHASED PRODUCT NAME |
|---|---|---|---|
|  |  |  |  |
|  |  |  |  |
|  |  |  |  |
|  |  |  |  |

TENANT (HAIR SALON) PURCHASE DATA

Fig. 4

| MEMBER ID | PURCHASE DATE AND TIME | PURCHASED PRODUCT NAME CODE | PURCHASED PRODUCT NAME |
|---|---|---|---|
|  |  |  |  |
|  |  |  |  |
|  |  |  |  |
|  |  |  |  |

TENANT (DRUGSTORE) PURCHASE DATA

DATABASE SYSTEM, DISTRIBUTED PROCESSING APPARATUS, DATABASE APPARATUS, DISTRIBUTED PROCESSING METHOD AND DISTRIBUTED PROCESSING PROGRAM

CROSS-REFERENCE TO RELATED APPLICATIONS

This application is a National Stage application under 35 U.S.C. § 371 of International Application No. PCT/JP2019/042120, having an International Filing Date of Oct. 28, 2019. The disclosure of the prior application is considered part of the disclosure of this application, and is incorporated in its entirety into this application.

TECHNICAL FIELD

The present invention relates to a database system, a distributed processing apparatus, a database apparatus, a distributed processing method, and a distributed processing program.

BACKGROUND ART

As a technique of processing a query across databases distributed via a network, a method of virtually integrating external databases has been known (Non-Patent Literatures 1 and 2).

According to Non-Patent Literatures 1 and 2, data items in the databases distributed via the network are integrated into a single server, and then the query is processed.

CITATION LIST

Non-Patent Literature

Non-Patent Literature 1: "Tableau", [Online], Internet <URL:https://www.tableau.com/ja-jp>
Non-Patent Literature 2: "PostgreSQL FDW", [Online], Internet <URL:https://www.postgresql.org/docs/11/postgres-fdw.html>

SUMMARY OF THE INVENTION

Technical Problem

In the case of integrating the data items in the databases distributed via the network into the single server and then processing the data items, the data items are transferred on the network. Accordingly, in the network, information intended not to be disclosed is unintentionally leaked, or viewed by a malicious third party, in some cases. In other cases, after data is transferred, information is unintentionally leaked by inappropriate management of authority and the like.

In a case where information intended not to be disclosed is not transferred via the network in order to prevent such information leakage, database matching using a member ID may not be performed, for example.

The present invention has been devised in view of the situations described above, and an object of the present invention is to provide a technique that does not integrate, into a single device, data items in a plurality of databases via a network, avoids leakage of information intended not to be disclosed, and processes a query related to the databases.

Means for Solving the Problem

To achieve the object described above, an aspect of the present invention provides a database system including: a distributed processing apparatus; and a plurality of database apparatuses, in which the distributed processing apparatus includes: a generation unit that generates an execution plan for a query related to the database apparatuses, based on a security policy; a transmission unit that divides the query in accordance with the execution plan and transmits instructions to the corresponding database apparatuses, the instructions including divided queries obtained by dividing the query and transfer destinations of execution results of the divided queries; and an output unit that receives the execution results of the queries from the database apparatuses, and outputs the execution results, the database apparatuses each include an execution unit that executes the divided query included in the instruction received from the distributed processing apparatus, and transmits the execution result to another database apparatus or the distributed processing apparatus serving as the transfer destination included in the instruction, and at least one of the output unit and the execution unit encrypts the execution result in accordance with the security policy.

An aspect of the present invention provides a distributed processing apparatus that includes: a generation unit that generates an execution plan for a query related to a plurality of database apparatuses based on a security policy; a transmission unit that divides the query in accordance with the execution plan and transmits instructions to the corresponding database apparatuses, the instructions including divided queries obtained by dividing the query and transfer destinations of execution results of the divided queries; and an output unit that receives the execution result of the query from the database apparatus and outputs the result, in which the output unit encrypts the execution result of the query in accordance with the security policy.

An aspect of the present invention provides a database apparatus that includes: an execution unit that receives, from a distributed processing apparatus, an instruction that includes a divided query obtained by dividing a query related to this database apparatus and one or more other database apparatuses in accordance with an execution plan for the query, and a transfer destination of an execution result of the divided query, executes the divided query, and transmits the execution result to another database apparatus or the distributed processing apparatus serving as the transfer destination; and a registration unit that accepts a registration request for the security policy, and transmits the security policy to the distributed processing apparatus, in which the execution unit encrypts the execution result of the divided query in accordance with the security policy, and transmits the encrypted execution result.

An aspect of the present invention provides a distributed processing method of a database system that includes a distributed processing apparatus and a plurality of database apparatuses, in which the distributed processing apparatus performs: a generation step of generating an execution plan for a query related to the database apparatuses based on a security policy; a transmission step of dividing the query in accordance with the execution plan and transmitting instructions to the corresponding database apparatuses, the instructions including divided queries obtained by dividing the query and transfer destinations of execution results of the divided queries; and an output step of receiving the execution results of the queries from the database apparatuses, and outputting the execution results, and the database apparatuses each perform an execution step of executing the divided query included in the instruction received from the distributed processing apparatus, and transmitting the execution result to another database apparatus or the distributed processing apparatus serving as the transfer destination included in the instruction, and at least one of the output step and the execution step encrypts the execution result in accordance with the security policy.

An aspect of the present invention provides a distributed processing program causing a computer to function as the distributed processing apparatus described above.

An aspect of the present invention provides a distributed processing program causing a computer to function as the database apparatus described above.

Effects of the Invention

According to the present invention, a technique can be provided that does not integrate, into a single device, data items in a plurality of databases via a network, avoids leakage of information intended not to be disclosed, and processes a query related to the databases.

BRIEF DESCRIPTION OF DRAWINGS

FIG. 2 shows an example of member data in a distributed DB in a department store.

FIG. 3 shows an example of purchase data in a distributed DB in a tenant (hair salon).

FIG. 4 shows an example of purchase data in a distributed DB in a tenant (drugstore).

DESCRIPTION OF EMBODIMENT

Hereinafter, an embodiment of the present invention is described with reference to the drawings.

(Configuration of Distributed DB System)

Figure 1:
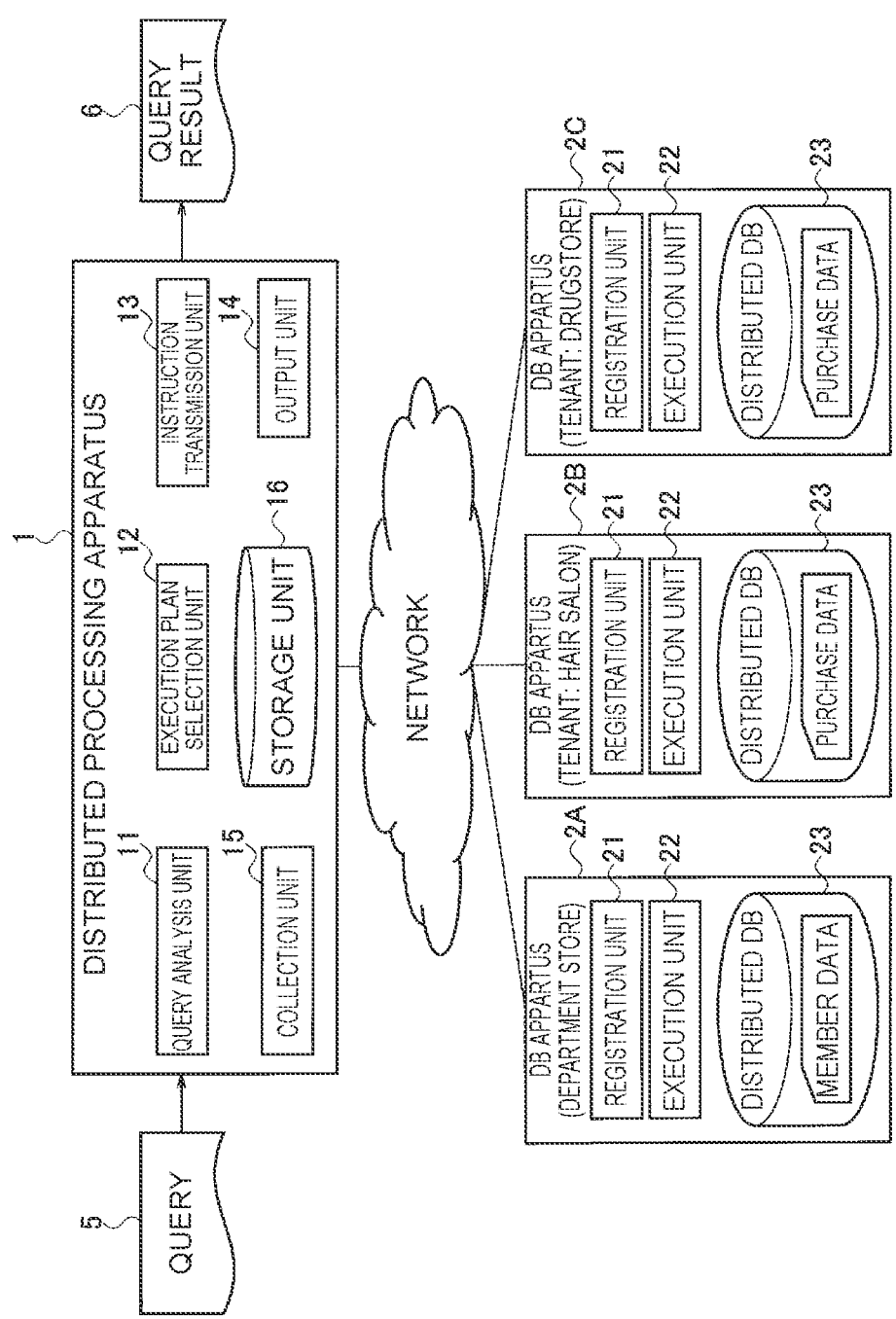
FIG. 1 shows a configuration example of a distributed DB system of an embodiment of the present invention.

FIG. 1 shows a configuration example of a distributed DB system (database system) of the present embodiment. The distributed DB system shown in the diagram includes a distributed processing apparatus 1 and a plurality of DB apparatuses 2A, 2B and 2C. The DB apparatus 2A is an apparatus that stores member data on a department store. The DB apparatus 2B is an apparatus that stores purchase data on a certain hair salon that is a tenant of the department store. The DB apparatus 2C is an apparatus that stores purchase data on a drugstore that is a tenant of the department store. Note that in a case where the DB apparatuses 2A, 2B and 2C are not distinguished one another, the devices may be sometimes described as DB apparatuses 2.

The distributed processing apparatus 1 and the DB apparatuses 2 are connected to each other in a manner communicable with the other apparatuses via a network. In the shown example, the number of DB apparatuses is three. However, the number of DB apparatuses is not limited to three. It is sufficient if the number of DB apparatuses 2 is at least two.

The distributed processing apparatus 1 processes a query (search condition) across the distributed DB apparatuses via the network on the basis of a security policy (hereinafter called "policy"). The distributed processing apparatus 1 shown in the diagram includes a query analysis unit 11, an execution plan generation unit 12, an instruction transmission unit 13, an output unit 14, a collection unit 15, and a storage unit 16.

The query analysis unit 11 analyzes an input query 5. The query 5 in the present embodiment is a query that relates to the plurality of DB apparatuses 2, that is, a query across the DB apparatuses 2.

The execution plan generation unit 12 (generation unit) generates an execution plan of the query 5 related to the DB apparatuses 2 on the basis of the policy. For example, suppose that a DB apparatus 2 is present in which a policy that prohibits predetermined data from being transferred to the other DB apparatuses 2 and the distributed processing apparatus 1 is registered. In the above case, the execution plan generation unit 12 generates an execution plan that adopts this DB apparatus 2 as a transfer destination of execution results of divided queries in the other DB apparatuses 2.

The instruction transmission unit 13 (transmission unit) causes the DB apparatuses 2 to process the query 5 in a distributed manner in accordance with the generated execution plan. Specifically, the instruction transmission unit 13 divides the query 5 in accordance with the execution plan, and transmits instructions that include divided queries obtained by dividing the query and transfer destinations of execution results of the divided queries, to the corresponding DB apparatuses 2.

The output unit 14 receives the execution result of the query 5 from the DB apparatus 2, and outputs the result as a query result 6. The output unit 14 may encrypt the execution result of the query 5 in accordance with the policy and output the result. The encryption process includes, for example, processes of masking, deleting, and encrypting data on a column (item) intended not to be disclosed.

The collection unit 15 collects policies registered in the individual DB apparatuses 2 from these DB apparatuses 2, and stores the policies in the storage unit 16. The storage unit 16 stores the policies transmitted from the individual DB apparatuses 2.

Each DB apparatus 2 includes a registration unit 21, an execution unit 22, and a distributed DB 23. The registration unit 21 accepts a policy registration request issued by a user, stores the policy in a storage unit (not shown) of the own device, and transmits the policy to the distributed processing apparatus 1.

The execution unit 22 executes the divided query included in the instruction received from the distributed processing apparatus 1, and transmits the execution result to the other DB apparatus 2 or the distributed processing apparatus 1 serving as the transfer destination included in the instruction. The execution unit 22 may encrypt the execution result of the divided query in accordance with the policy of the own DB apparatus 2 or another DB apparatus 2. The execution unit may encrypt the execution result of the divided query in accordance with the policy that prohibits predetermined data from being transferred to the other apparatuses, and transmit the encrypted execution result to the apparatus that is the transfer destination. The encryption process includes, for example, processes of masking, deleting, and encrypting data on a column (item) intended not to be disclosed. The distributed DB 23 stores at least one database.

FIGS. 2 to 4 show examples of data stored in the individual distributed DBs 23 shown in FIG. 1. FIG. 2 shows member data stored in the distributed DB 23 of the DB apparatus 2A of the department store. The member data (member table) in FIG. 2 is tabular form data that associates the member ID, name, age, and gender with one another. In this embodiment, the member ID and the name are data (immobile data) prohibited from being transferred to the other DB apparatuses 2B and 2C and the distributed processing apparatus 1.

FIG. 3 shows purchase data stored in the distributed DB 23 of the DB apparatus 2 of the hair salon. The purchase data (purchase table) of FIG. 3 is data indicating products sold in the hair salon or services provided therein. The shown purchase data is tabular form data that associates the department store member ID, purchase date and time, purchased product name code, and purchased product name with one another.

FIG. 4 shows purchase data stored in the distributed DB 23 of the DB apparatus 2 of the drugstore. The purchase data (purchase table) of FIG. 4 is data indicating products sold in the drugstore or services provided therein. The shown purchase data is tabular form data that associates the department store member ID, purchase date and time, purchased product name code, and purchased product name with one another.

(Operation of Distributed DB System)

Hereinafter, the operation of the distributed DB system in this embodiment is described.

Figure 5:
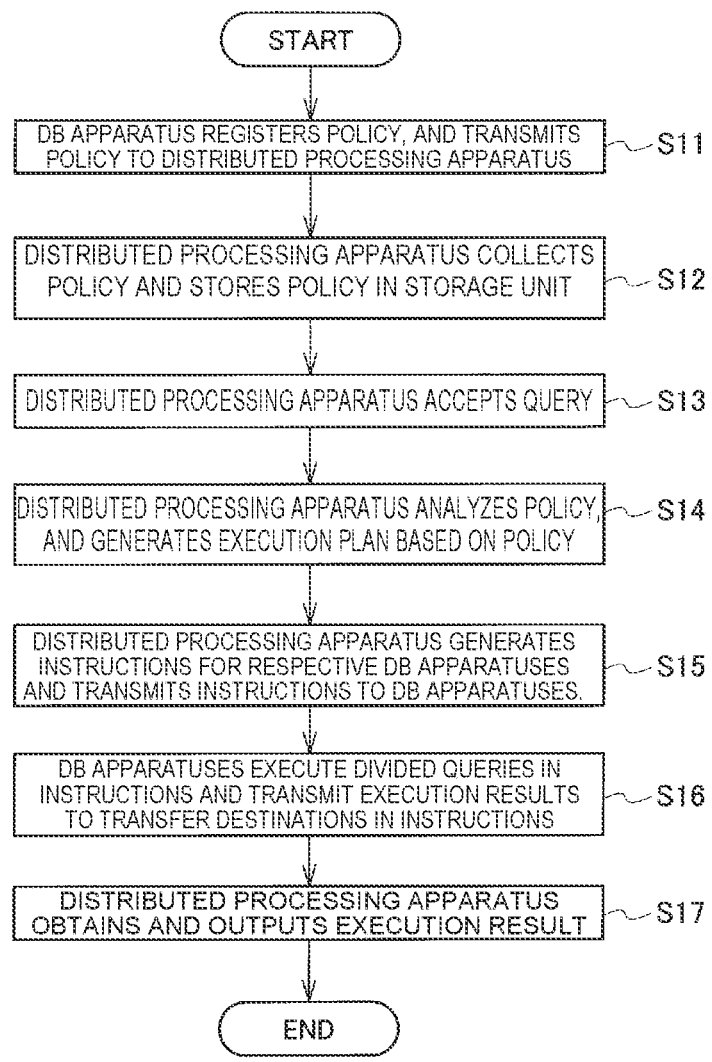
FIG. 5 is a flowchart showing the operation of the distributed DB system.

FIG. 5 is a flowchart showing the operation of the distributed DB system in this embodiment. The registration unit 21 of each DB apparatus 2 accepts a policy input by a user, such as a system administrator, for the distributed DB 23 included in the own device 2, registers the policy in a storage unit (not shown), and transmits the policy to the distributed processing apparatus 1 (S11). The collection unit 15 of the distributed processing apparatus 1 collects policies from the individual DB apparatuses 2, and stores the policies in the storage unit 16 (S12).

Note that processes in S11 and S12 are not necessarily performed every time the processes in or after S13 are performed. For example, in a case where the policies have already been stored in the storage unit 16, S11 and S12 are not performed, and the distributed processing apparatus 1 uses the policies stored in the storage unit 16. That is, transmission of the policy from the DB apparatus 2 serves as a trigger, which executes S11 and S12.

Next, the distributed processing apparatus 1 accepts the query input from the user (S13). The distributed processing apparatus 1 analyzes the input query and generates an execution plan that can execute the query on the basis of the policy stored in the storage unit 16 (S14). Suppose that immobile data, such as a policy (no-transfer policy) "the member ID and name are not allowed to be externally disclosed" is present in the department store DB apparatus 2A. In the above case, the distributed processing apparatus 1 generates an execution plan for collecting pieces of data required for analysis in the DB apparatus 2 holding the immobile data.

The distributed processing apparatus 1 divides the input query in accordance with the generated execution plan, and generates divided queries for the individual DB apparatuses 2. The distributed processing apparatus 1 then generates instructions that include divided queries and transfer destinations of execution results of the divided queries, individually for the DB apparatuses 2, and transmits the instructions corresponding to the individual DB apparatuses 2 (S15). The divided queries are obtained by dividing the input query into execution items in the individual DB apparatuses 2. The DB apparatuses 2 execute the divided queries in accordance with the instructions, and transfer execution results to the transfer destinations in the instructions (S16). The DB apparatus 2 may edit and encrypt the execution result of the divided query in accordance with the policy.

The distributed processing apparatus 1 receives the execution results from the DB apparatuses 2, and outputs the results (S17). The distributed processing apparatus 1 may edit and encrypt the execution results received from the DB apparatuses 2 in accordance with the policy. The encryption includes, for example, processes of masking, deleting, and encrypting data on the column (item) intended not to be disclosed. The encryption includes processes of performing an operation allowed for a column or table intended not to be disclosed, and of securing that the edit result is a search of a group.

Exemplary Embodiment 1

Figure 6:
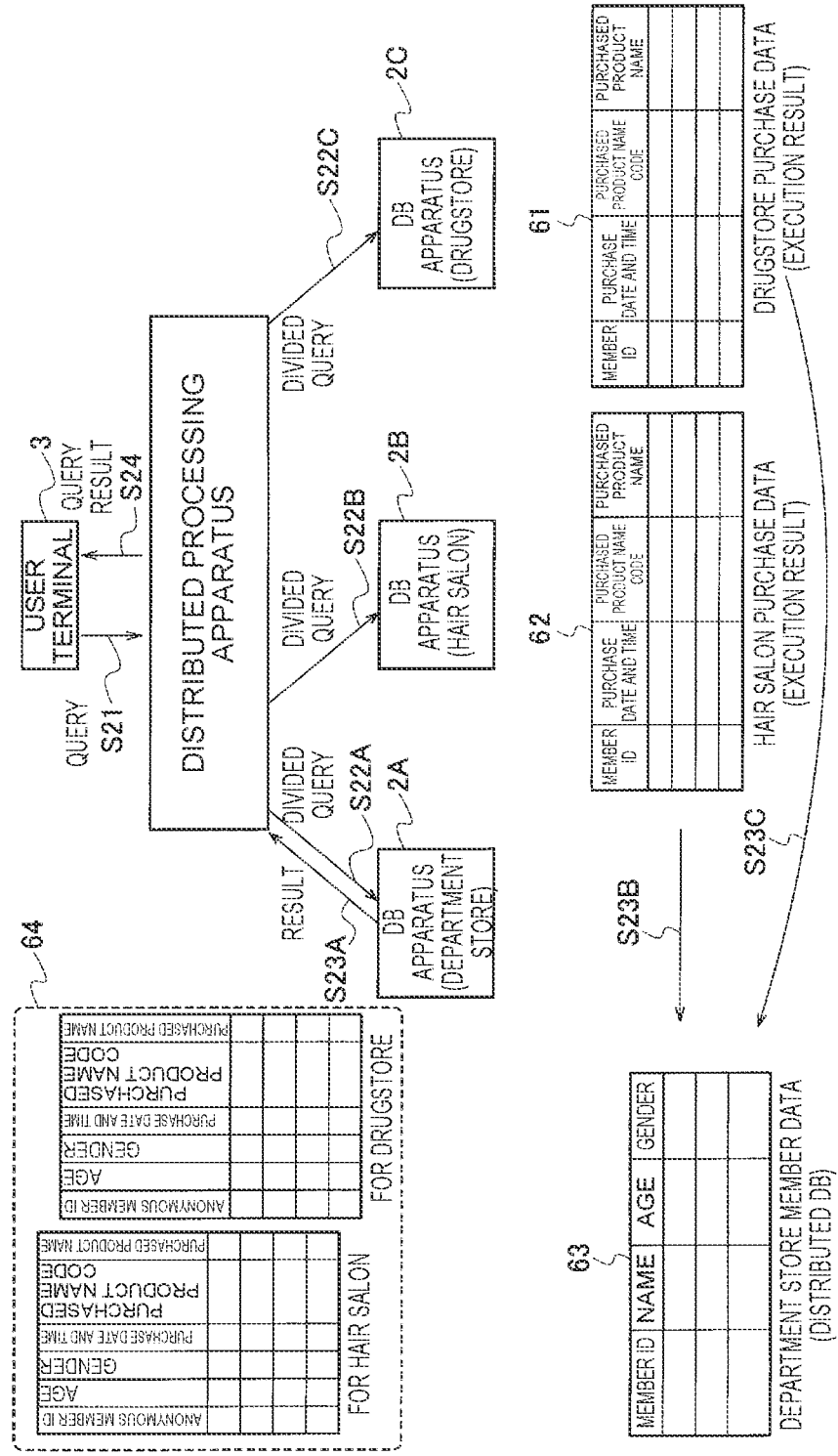
FIG. 6 illustrates the operation of a distributed DB system in an exemplary embodiment 1.

FIG. 6 illustrates the operation of a distributed DB system in an exemplary embodiment 1. Here, a case is described in which a marketer (user) of the department store executes a query as described below in order to run a campaign of pleasing customers visiting the hair salon. That is, a query related to the three DB apparatuses 2 shown in FIG. 1 is a query for checking what the customer visiting the hair salon buys in the drugstore.

The department store issues rewards cards. Therefore, the department store can apprehend who is the customer using a rewards card. However, in order to know "what is bought?", it is required to check the distributed DB 23 held by each tenant.

It is herein assumed that the department store has a policy "the member ID and name are not allowed to be externally disclosed". Such a policy is a no-transfer policy that prohibits predetermined data from being transferred to the other apparatuses, that is, a policy for presence of data immobile to another apparatus. For the sake of safe data management, an analysis result of the query in conformity with the policy described above is required.

The system administrator of the department store preliminarily inputs and sets a policy "the member ID and name are not allowed to be externally disclosed" in the registration unit 21 of the DB apparatus 2A of the department store. It is assumed that each tenant has no policy, and no policy is registered in the DB apparatuses 2B and 2C of the tenants. In this case, only the DB apparatus 2A of the department store transmits the own policy to the distributed processing apparatus 1. The distributed processing apparatus 1 obtains the policy from the DB apparatus 2A of the department store, and stores the policy in the storage unit 16.

The distributed processing apparatus 1 accepts the query input by the user (S21). It is herein assumed that the user who is a marketer of the department store inputs a query for obtaining an analysis result, such as the attributes of customers visiting both the hair salon and the drugstore on a predetermined day, and purchase histories of behaviors in certain purchase orders.

The distributed processing apparatus 1 analyzes the input query and generates an execution plan that can execute the query on the basis of the policy of the DB apparatus 2A of the department store registered in the storage unit 16. Here, a policy for presence of no-transfer data immobile to the other apparatuses, that is, the department store's "member ID and name are not allowed to be externally disclosed" is present. If such a policy of no-transfer data is present, the distributed processing apparatus 1 generates an execution plan for collecting pieces of data required for analysis this time in the DB apparatus 2A of the department store that stores the no-transfer data. That is, the distributed processing apparatus 1 generates an execution plan for adopting the DB apparatus 2A of the department store as the transfer destination of the execution results of divided queries in the other DB apparatuses 2B and 2C.

The distributed processing apparatus 1 then divides a query to generate divided queries for the individual DB apparatuses in accordance with the execution plan, and transmits instructions that include divided queries and transfer destinations of execution results of the divided queries to the DB apparatuses 2A, 2B and 2C (S22A, S22B and S22C).

In S22B, the divided query to be transmitted to the DB apparatus 2B of the hair salon, which is a tenant, is obtained by extracting purchase data on a predetermined day designated by the query from the distributed DB 23. The transfer destination of the execution result of the divided query is the DB apparatus 2A of the department store. The DB apparatus 2B of the hair salon extracts purchase data on the predetermined day from the distributed DB 23 of this apparatus in accordance with the instruction in S22B, and transfers the extracted purchase data 62 to the DB apparatus 2A of the department store (S23B).

In S22C, the divided query to be transmitted to the DB apparatus 2C of the drugstore, which is a tenant, is obtained by extracting purchase data on a predetermined day designated by the query from the distributed DB 23. The transfer destination of the execution result of the divided query is the DB apparatus 2A of the department store. The DB apparatus 2C of the drugstore extracts purchase data on the predetermined day from the distributed DB 23 of this apparatus in accordance with the instruction in S22C, and transfers the extracted purchase data 61 to the DB apparatus 2A of the department store (S23C).

In S22A, the divided query to be transmitted to the DB apparatus 2A of the department store is as follows. The transfer destination of the execution result of the divided query is the distributed processing apparatus 1.

(1) Member IDs common to the purchase data 62 transmitted from the DB apparatus 2B of the hair salon, and the purchase data 61 transmitted from the DB apparatus 2 of the drugstore are extracted.

(2) Only records with the common member IDs are extracted from the two pieces of purchase data 61 and 62.

(3) The attribute information (age and gender) on member data 63 that has the corresponding member ID and is stored in the distributed DB 23 of the department store is added, with respect to the member ID adopted as a key, to each of the two pieces of purchase data (not shown) obtained by extracting only the records with the common member ID.

The DB apparatus 2A of the department store executes the divided queries (1) to (3) described above, edits the execution results in accordance with the policy registered in this apparatus 2A, encrypts the data prohibited from being disclosed, and transmits the data to the distributed processing apparatus 1, which is the transfer destination (S23A).

The execution result of the divided query by the DB apparatus 2A of the department store is the purchase data on the hair salon to which the attribute information on the predetermined day is added, and the purchase data on the drugstore to which the attribute information on the predetermined day is added.

The execution results include the member ID specified in accordance with the policy "the member ID and name are not allowed to be externally disclosed". Therefore, the DB apparatus 2A of the department store encrypts the member ID. Here, the DB apparatus 2A of the department store converts (anonymizes) the member IDs in the purchase data on the hair salon and the purchase data on the drugstore into fictional anonymous member IDs in accordance with a predetermined conversion rule. Note that the member IDs and the anonymous member IDs are associated with each other on a one-to-one basis. The same conversion rule is applied to the purchase data on the hair salon and the purchase data on the drugstore. Therefore, the purchase data on the hair salon and the purchase data on the drugstore can be associated with each other using the anonymous member IDs.

The execution result of the divided query and the policy by the DB apparatus 2A of the department store is the purchase data for the hair salon and the purchase data 64 for the drugstore, as shown in the diagram. That is, each of the two pieces of purchase data is tabular form data that includes columns (items) of the anonymous member ID, age, gender, purchase date and time, purchased product name code, and incorporated product name.

The distributed processing apparatus 1 receives the execution result 64 from the DB apparatus 2A of the department store, and outputs the result to a user terminal 3 (S24). Here, the DB apparatus 2A of the department store has performed the member ID encryption process in accordance with the policy. Accordingly, the distributed processing apparatus 1 is not required to perform the encryption process in accordance with the policy.

The distributed processing apparatus 1 may analyze the execution result received from the DB apparatus 2A of the department store in accordance with the query, and output the analysis result to the user terminal 3. For example, the distributed processing apparatus 1 analyzes statistical information on the attributes of customers having visited both the hair salon and the drugstore on a certain day, and purchase behaviors (purchase histories) in the order of purchase in the hair salon and the drugstore, and output the analysis result to the user terminal 3.

As described above, in this exemplary embodiment, the analysis result that includes the attributes of the customers having visited both the hair salon and the drugstore on a certain day, and the order of purchase behaviors can be output in accordance with the policy.

Exemplary Embodiment 2

In the exemplary embodiment 1, the case where only the department store has the policy has been described. In an exemplary embodiment 2, a case is described where not only the department store but also the drugstore, which is a tenant, has the policy.

Figure 7:
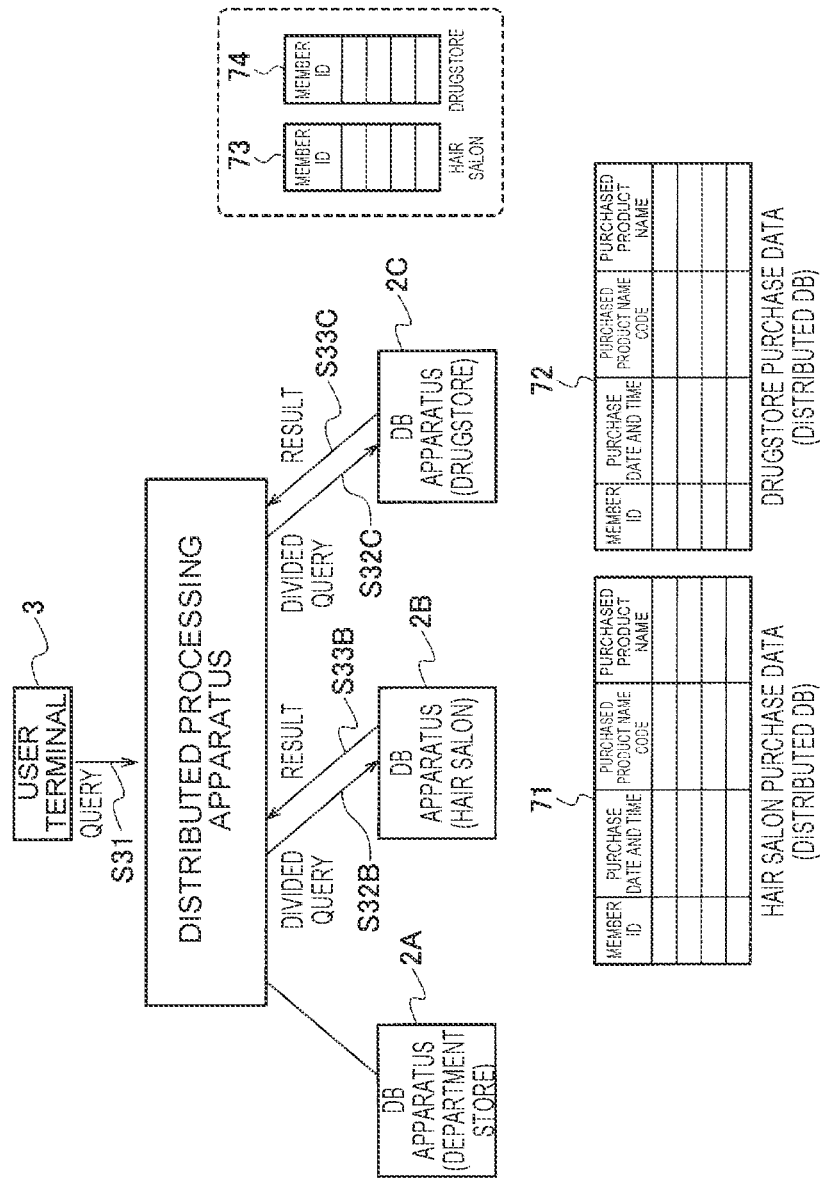
FIG. 7 illustrates the operation of a distributed DB system in an exemplary embodiment 2 (1/2).
Figure 8:
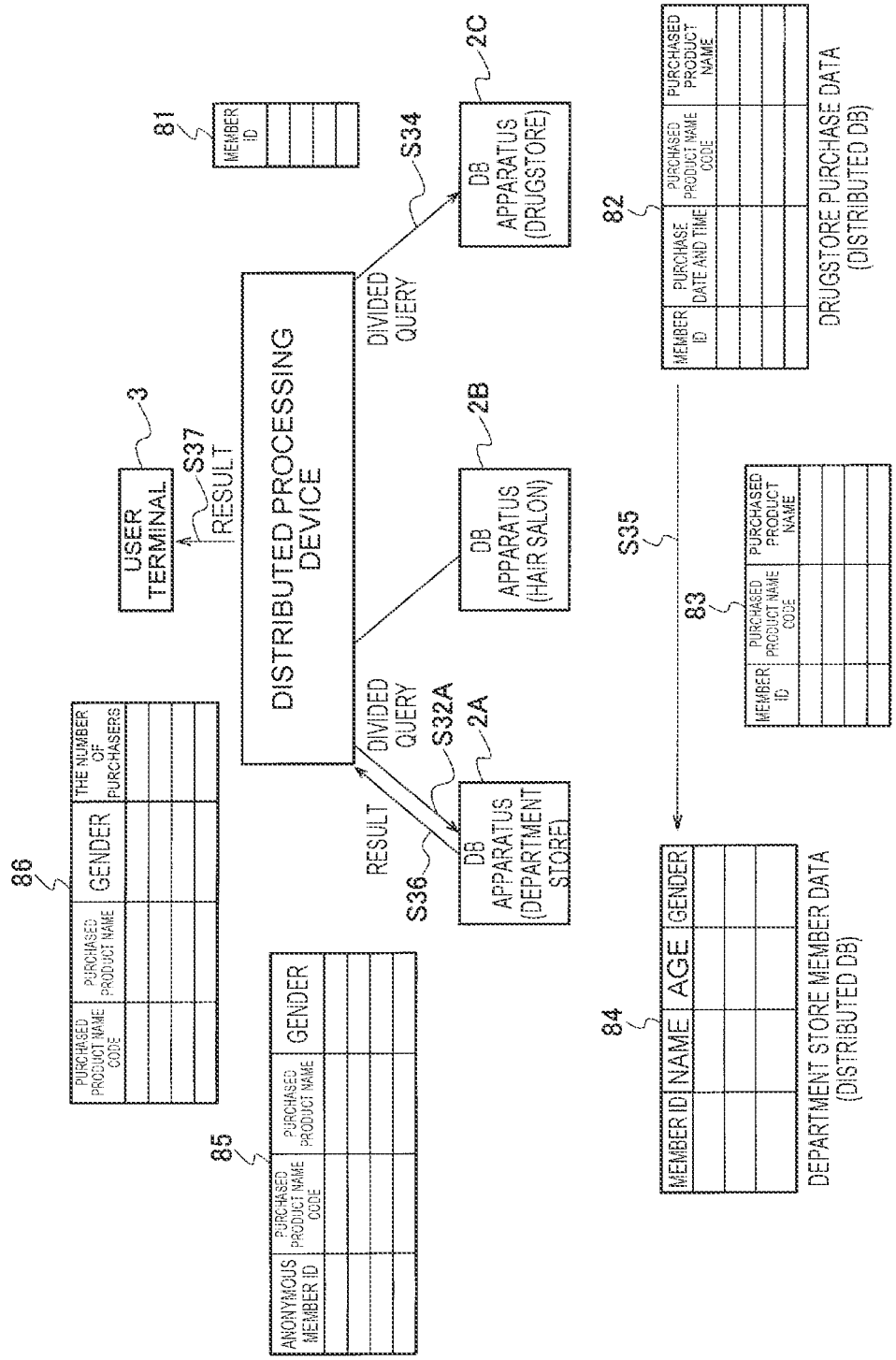
FIG. 8 illustrates the operation of a distributed DB system in the exemplary embodiment 2 (2/2).

FIGS. 7 and 8 illustrate the operation of a distributed DB system in the exemplary embodiment 2. Here, the analysis result on what the customers visiting both the hair salon and the drugstore on a certain day purchased in the drugstore is output in accordance with the policy.

It is herein assumed that likewise with the exemplary embodiment 1, the department store has the policy "the member ID and name are not allowed to be externally disclosed" (no-transfer policy). The drugstore further has policies "processing results where customers are visible are not allowed to be displayed" and "only the number of purchasers with respect to each product name and each gender are allowed to be displayed". The hair salon has no policy. For the sake of safe data management, an analysis result in conformity with the policy described above is required.

The system administrator of the department store preliminarily inputs and sets the policy "the member ID and name are not allowed to be externally disclosed" in the DB apparatus 2A of the department store. The DB apparatus 2A of the department store transmits the own policy to the distributed processing apparatus 1.

Likewise, a system administrator of the drugstore preliminarily inputs and sets, in the DB apparatus 2B of the drugstore, the policies "processing results where customers are visible are not allowed to be displayed" and "only the number of purchasers with respect to each product name and each gender are allowed to be displayed". The DB apparatus 2B of the drugstore transmits the own policy to the distributed processing apparatus 1. The distributed processing apparatus 1 obtains the policies from the DB apparatus 2A of the department store and the DB apparatus 2C of the drugstore, and stores the policies in the storage unit 16.

As shown in FIG. 7, the distributed processing apparatus 1 accepts the query input by the user (S31). The user who is a marketer of the department store inputs, in the distributed processing apparatus 1, a query for analyzing which items the customers visiting both the hair salon and the drugstore on a predetermined day purchase in the drugstore.

The distributed processing apparatus 1 analyzes the input query, and generates an execution plan that can execute the input query on the basis of the policies of the department store and the drugstore registered in the storage unit 16. Here, likewise with the exemplary embodiment 1, the department store has the policy of no-transfer data (the member ID and name are not allowed to be externally disclosed). Therefore, the distributed processing apparatus 1 generates an execution plan for collecting pieces of data required for analysis this time, in the DB apparatus 2A of the department store holding the no-transfer data. That is, the distributed processing apparatus 1 generates an execution plan for adopting the DB apparatus 2A of the department store as the transfer destination of the execution results of divided queries in the other DB apparatuses 2B and 2C.

The distributed processing apparatus 1 then divides a query to generate divided queries for the individual DB apparatuses in accordance with the execution plan, and transmits instructions that include divided queries and transfer destinations of execution results of the divided queries to the DB apparatuses (S32A, S32B and S32C). Transmission of the divided query for the DB apparatus 2A of the department store (S32A) is described later with reference to FIG. 8.

In S32B, the divided query to be transmitted to the DB apparatus 2B of the hair salon is obtained by extracting the member IDs of purchase data on a predetermined day designated by the query from the purchase data 71 of the distributed DB 23. The transfer destination of the execution result of the divided query is the distributed processing apparatus 1. The DB apparatus 2B of the hair salon transfers the member ID 73 of the customer having purchased on a predetermined day in accordance with the instruction in S32B, to the distributed processing apparatus 1 (S33B).

In S32C, the divided query to be transmitted to the DB apparatus 2C of the drugstore is obtained by extracting the member IDs of purchase data on a predetermined day designated by the query from the purchase data 72 of the distributed DB 23. The transfer destination of the execution result of the divided query is the distributed processing apparatus 1. The DB apparatus 2C of the drugstore transfers the member ID 74 of the customer having purchased on a predetermined day in accordance with the instruction in S32C, to the distributed processing apparatus 1 (S33C).

In FIG. 8, the distributed processing apparatus 1 extracts the member ID 81 common among the member IDs received from the DB apparatus 2B of the hair salon and the member IDs received from the DB apparatus 2C of the drugstore. The common member ID 81 is the member ID of the customer who purchased services or products both in the hair salon and the drugstore on the predetermined day.

The distributed processing apparatus 1 then transmits the divided query that includes the common member ID 81 to the DB apparatus 2C of the drugstore, for the sake of analyzing the gender of the customer having the common member ID 81, and the items purchased in the drugstore (S34).

In S34, the divided query to be transmitted to the DB apparatus 2C of the drugstore is for extracting purchase data on the predetermined day having the common member ID 81, from the purchase data 82 in the distributed DB 23, and for deleting purchase dates and times unnecessary for analysis from the extracted purchase data. The transfer destination of the execution result 83 of the divided query is the DB apparatus 2A of the department store.

The DB apparatus 2C of the drugstore transfers the purchase data 83 extracted in accordance with the instruction in S34 to the DB apparatus 2A of the department store (S35). The purchase data 83 that is the execution result of the DB apparatus 2C of the drugstore is tabular form data that includes the member ID, purchased product name code, and purchased items.

As described above, the distributed processing apparatus 1 transmits an instruction that includes the divided query and the transfer destination of the execution result of the divided query, to the DB apparatus 2A of the department store (S32A). In S32A, the divided query to be transmitted to the DB apparatus 2A of the department store is as follows. The transfer destination of the execution result of the divided query is the distributed processing apparatus 1.

(1) The gender of the member ID corresponding to the member data 84 stored in the distributed DB of the department store is added to the purchase data 83 transmitted from the DB apparatus 2C of the drugstore, with respect to the member ID as the key.

The DB apparatus 2A of the department store executes the divided query (1) described above, edits the execution results in accordance with the policy registered in this apparatus 2A, encrypts the data prohibited from being disclosed, and transmits the data to the distributed processing apparatus 1, which is the transfer destination (S36).

The execution result of the divided query by the DB apparatus 2A of the department store is purchase data on the drugstore (not shown) obtained by adding the corresponding gender to the purchase data 83 transmitted from the DB apparatus 2C of the drugstore. The execution results include the member ID specified in accordance with the policy "the member ID and name are not allowed to be externally disclosed". Therefore, the DB apparatus 2A of the department store encrypts the member ID. Encryption of the member ID is similar to that in the exemplary embodiment 1. Therefore, the description thereof is omitted.

The execution result of the divided query and the policy by the DB apparatus 2A of the department store is purchase data 85 on the drugstore shown in the diagram. The purchase data 85 is tabular form data that includes columns of the anonymous member ID, purchased product name code, purchased product name, and gender.

The distributed processing apparatus 1 receives the execution result 85 from the DB apparatus 2A of the department store, edits the execution result in accordance with the policy of the drugstore registered in the storage unit 16, and outputs the result to the user terminal 3 (S37). The policies of the drugstore are "processing results where customers are visible are not allowed to be displayed" and "only the number of purchasers with respect to each product name and each gender are allowed to be displayed".

The distributed processing apparatus 1 edits and analyzes the execution result 85 in accordance with the policy of the drugstore, and outputs an analysis result 86 indicating the number of purchasers with respect to each purchased item and each of the genders of customers who purchased the items in both the hair salon and the drugstore on a predetermined day. The analysis result 86 shown in the diagram is tabular form data that includes columns of the purchased product name code, purchased product name, gender, and the number of purchasers.

Note that this modified example assumes that the distributed processing apparatus 1 edits and encrypts the execution result 85 received from the DB apparatus 2A of the department store in accordance with the policy of the drugstore, and generates the analysis result 86. Alternatively, the DB apparatus 2A of the department store may edit and encrypt the execution result 85 of the divided query in accordance with the policy of the drugstore, and transmit the edited and encrypted execution result 86 to the distributed processing apparatus 1. In this case, it is assumed that an instruction that is transmitted by the distributed processing apparatus 1 to the DB apparatus 2A of the department store in S32A includes the policy of the drugstore besides the divided query and the transfer destination.

As described above, in this exemplary embodiment, the analysis result that includes which product the customer having visited both the hair salon and the drugstore on a certain day purchased in the drugstore with respect to each gender can be output in accordance with the policy.

Effects of this Embodiment

In the distributed DB system of this embodiment described above, the distributed processing apparatus 1 includes: the generation unit 12 that generates an execution plan for a query related to the DB apparatuses 2 based on a security policy; the transmission unit 13 that divides the query in accordance with the execution plan and transmits instructions to the corresponding DB apparatuses 2, the instructions including divided queries obtained by dividing the query and transfer destinations of execution results of the divided queries; and the output unit 14 that receives the execution result of the query from the DB apparatus 2, and outputs the execution result, and the DB apparatuses 2 each include the execution unit 22 that executes the divided query included in the instruction received from the distributed processing apparatus 1, and transmits the execution result to another DB apparatus 2 or the distributed processing apparatus 1 serving as the transfer destination included in the instruction, and at least one of the output unit 14 and the execution unit 22 encrypts the execution result in accordance with the security policy.

Accordingly, in this embodiment, data items in the plurality of DB apparatuses 2 via a network are not integrated into a single apparatus, leakage of information intended not to be disclosed can be avoided, and a query related to the DB apparatuses 2 can be processed.

In this embodiment, data items are not required to be integrated into a single apparatus. Accordingly, leakage via the network and the induction of an operational mistake can be minimized. In this embodiment, the query related to data items distributed among the DB apparatuses 2 can be processed while strictly conforming to the data disclosure policy.

In this embodiment, the execution results are transmitted and received between the apparatuses 1 and 2 and the query is executed without integrating the data items in the DB apparatuses 2 into a single apparatus. Therefore, even in the case of presence of the policy prohibiting data from being transferred to the outside, the query related to the DB apparatuses 2 can be executed. That is, the query can be executed without transferring the no-transfer data in a predetermined DB apparatus 2 to another apparatus. Specifically, in this embodiment, even in the case of presence of the policy prohibiting classified data, such as personal information, from being transferred, the query related to the distributed DBs including data prohibited from being transferred can be executed. Accordingly, in this embodiment, data items prohibited from being transferred to the outside can be analyzed.

(Hardware Configurations of Distributed Processing Apparatus and DB Apparatuses)

Figure 9:
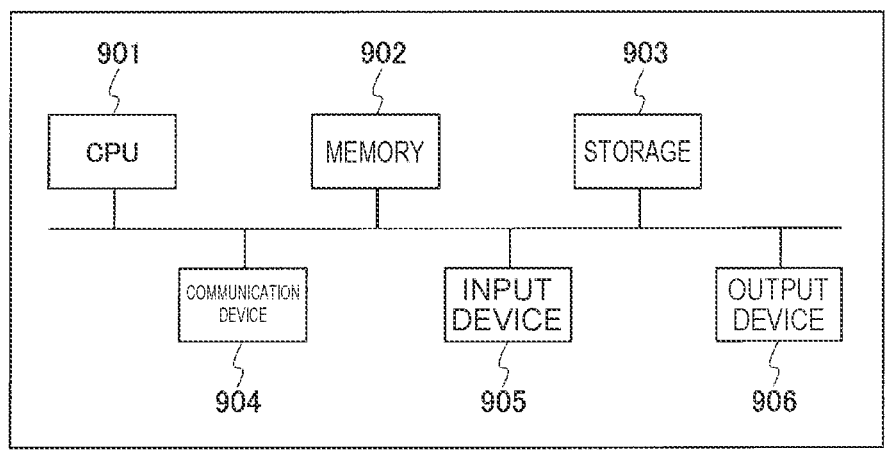
FIG. 9 shows a hardware configuration example of a distributed processing apparatus and a DB apparatus.

The distributed processing apparatus 1 and the DB apparatuses 2 described above can be achieved using, for example, a general-purpose computer system as shown in FIG. 9. The shown computer system includes a CPU (a Central Processing Unit, a processor) 901, a memory 902, a storage 903 (HDD: Hard Disk Drive, SSD: Solid State Drive), a communication device 904, an input device 905, and an output device 906. The memory 902 and the storage 903 are storage devices. In this computer system, the CPU 901 executes a predetermined program loaded on the memory 902, thereby achieving each function of each apparatus. For example, each of the functions of the distributed processing apparatus 1 and the DB apparatuses 2 is achieved through execution of a program by the CPU of the distributed processing apparatus 1 in the case of the program for the distributed processing apparatus 1, and through execution of a program by the CPU of the corresponding DB apparatus 2 in the case of the program for the DB apparatus 2.

The distributed processing apparatus 1 and the DB apparatuses 2 may be implemented in a single computer or in a plurality of computers. The distributed processing apparatus 1 and the DB apparatuses 2 may be virtual machines implemented in one or more computers.

The program for the distributed processing apparatus 1 and the programs for the DB apparatuses 2 may be stored in computer-readable recording media, such as HDDs, SSDs, USB (Universal Serial Bus) memories, CDs (Compact Discs) and DVDs (Digital Versatile Discs), or be distributed via a network.

Note that the present invention is not limited to the embodiment and modified examples described above, and can be variously modified in a range of the gist thereof.

REFERENCE SIGNS LIST

1 Distributed processing apparatus
11 Query analysis unit
12 Execution plan generation unit
13 Instruction transmission unit 14 Output unit
15 Collection unit
16 Storage unit
2A, 2B, 2C DB apparatus
21 Registration unit
22 Execution unit
23 Distributed DB
5 Query
6 Query result

The invention claimed is:

1. A database system comprising: a distributed processing apparatus; and a plurality of database apparatuses, wherein the distributed processing apparatus includes one or more processors configured to: generate an execution plan for a query related to the database apparatuses based on a security policy; divide the query in accordance with the execution plan and transmit instructions to the corresponding database apparatuses, the instructions including divided queries obtained by dividing the query and transfer destinations of execution results of the divided queries;

receive the execution results of the queries, from the corresponding database apparatuses, and output the execution results, wherein each database apparatus of the plurality of database apparatuses includes one or more processors and is configured to execute the divided query included in the instruction received from the distributed processing apparatus and transmit the execution result to another database apparatus or the distributed processing apparatus serving as the transfer destination included in the instruction; and wherein the distributed processing apparatus is configured to encrypt the execution result in accordance with the security policy.

2. The database system according to claim 1, wherein each database apparatus of the plurality of database apparatuses is configured to: a accept a registration request for the security policy; and transmit the security policy to the distributed processing apparatus.

3. The database system according to The database system according to wherein if a database apparatus is present in which the security policy prohibiting predetermined data from being transferred to the other database apparatuses and the distributed processing apparatus is registered, the distributed processing apparatus is configured to generate an execution plan that adopts the database apparatus as a transfer destination of execution results of set of divided queries in the other database apparatuses.

4. The database system of claim 1, wherein the one or more processors are further configured to:

generate, from the query, a set of divided queries for performing corresponding executions in accordance with the execution plan, wherein the set of divided queries are generated according to a type of data stored in each of the database apparatuses and the corresponding executions to be performed on the type of data for each of the database apparatuses.

5. A distributed processing method of a database system that comprises a distributed processing apparatus and a plurality of database apparatuses, comprising:

generating, by the distributed processing apparatus, an execution plan for a query related to the database apparatuses based on a security policy; dividing the query in accordance with the execution plan and transmitting instructions to the corresponding database apparatuses, the instructions including divided queries obtained by dividing the query and transfer destinations of execution results of the divided queries;

receiving, by the distributed processing apparatus, the execution results of the queries from the corresponding database apparatuses and outputting the execution results, executing, by each database apparatus, the divided query included in the instruction received from the distributed processing apparatus;

transmitting, by each database apparatus, the execution result to another database apparatus or the distributed processing apparatus serving as the transfer destination included in the instruction; and encrypting, by each database apparatus, the execution result in accordance with the security policy.

* * * * *